United States Patent Office 3,027,397
Patented Mar. 27, 1962

3,027,397
METHOD FOR PREPARING 2,6-DI-TERT-ALKYL-PHENOXYBORON DIHALIDES
Howard Steinberg, Fullerton, and Don L. Hunter, Long Beach, Calif., assignors to United States Borax & Chemical Corporation, Los Angeles, Calif., a corporation of Nevada
No Drawing. Filed Nov. 7, 1960, Ser. No. 67,509
5 Claims. (Cl. 260—462)

The present invention relates as indicated to a method for preparing 2,6-di-tert-alkylphenoxyboron dihalides.

The 2,6-di-tert-alkylphenoxyboron dihalides find utility as active herbicides and fungicides when used alone or in combination with many of the well-known organic herbicides. These compounds will be found to be extremely useful chemical intermediates for the preparation of thermally and hydrolytically stable borate esters and they can readily be converted to hindered phenolic borate esters in high yields of substantially pure quality.

It is therefore the principal object of this invention to provide a method for preparing the 2,6-di-tert-alkylphenoxyboron dihalides.

Other objects of the invention will appear as the description proceeds.

To the accomplishment of the foregoing and related ends, said invention then comprises the features hereinafter fully described and pointed out in the claims, the following description setting forth in detail certain illustrative embodiments of the invention, these being indicative, however, of but a few of the various ways in which the principle of the invention may be employed.

Broadly stated, the present invention comprises the method for preparing 2,6-di-tert-alkylphenoxyboron dihalides which comprises preparing a dispersion of an alkali metal in an inert hydrocarbon solvent, reacting said alkali metal dispersion with a 2,6-di-tert-alkylphenol, cooling the reaction mass to about $-60°$ C., reacting said cooled reaction mass with a boron trihalide, allowing the resultant reaction mass to warm slowly to ambient temperature, removing the solids from the reaction mass and recovering substantially pure 2,6-di-tert-alkylphenoxyboron dihalide from the filtrate.

The alkylphenols used as reactants in the present process are characterized by the described substitution of tertiary alkyl radicals at the 2- and the 6-positions of the phenol. The phenol may also be further substituted at the 3-, 4-, and 5-positions by similar tertiary alkyl radicals or by other radicals such as, for example, normal alkyl, isoalkyl, phenyl and the like without affecting the described method for preparing the 2,6-di-tert-alkylphenoxyboron dihalides, it only being important to the present invention that the alkylphenol is substituted at the 2- and 6-positions with tertiary alkyl radicals. The following list is a partial enumeration of the phenols applicable to the present invention:

2,6-di-tert-butylphenol
2,6-di-tert-butyl-4-methylphenol
2,6-di-tert-amylphenol
2,4,6-tri-tert-amylphenol
2,6-di-(2-methyl-2-pentyl)phenol
2,6-di-(2-methyl-2-nonyl)-3,4-dimethylphenol
2,6-di-(2-methyl-2-heptyl)-4-phenylphenol
2,6-di-(2-methyl-2-hexyl)-4-isopropylphenol
2,6-di-(2-methyl-2-nonyl)-3,4,5-triethylphenol
2,6-di-(2-methyl-2-octyl)phenol
2,6-di-tert-butyl-4-n-butylphenol
2,4,6-tri-tert-butylphenol The above list is only a partial enumeration of the 2,6-di-tert-alkylphenols which may be used in the present process. In the preferred embodiment of our invention we use the commercially available 2,6-di-tert-butylphenol, 2,6-di-tert-butyl-4-methylphenol, 2,6-di-tert-amylphenol and 2,4,6-tri-tert-amylphenol.

The first step of the reaction of the present process is the preparation of an alkali metal dispersion. Any of the alkali metals, sodium, potassium and lithium, are applicable; however, sodium metal is preferred since it is the cheapest. The dispersion is prepared by adding the alkali metal to a vigorously agitated inert hydrocarbon solvent. Any inert hydrocarbon solvent is applicable to the present process; however, for the sake of economy in the preferred embodiment of our invention we use benzene, toluene, xylene or mineral oil as the dispersion medium.

So that the present invention can be more easily understood, the following examples are given for illustrative purposes:

(I)

Into a two-liter, three-necked flask were added 750 ml. of toluene and 34.5 grams (1.5 gram atoms) of sodium. The flask was connected to a high speed stirrer and a dispersion was made of the sodium. A pressure equalizing funnel was attached to the flask and 206.3 grams (1 mole) of 2,6-di-tert-butylphenol was added slowly with moderate stirring. The reaction mixture which contained a voluminous precipitate was then cooled to about $-60°$ C. in a Dry Ice-acetone bath and 117.2 grams (1 mole) of boron trichloride was added slowly to the mixture. The reaction mass was then allowed to warm to room temperature and was filtered through a large sintered glass filter to remove any solids.

The filtrate was then set up for distillation through an 18-inch Vigreaux column and the toluene was removed. 213 grams (75% yield) of 2,6-di-tert-butylphenoxyboron dichloride was recovered. Chemical anaylsis yielded the following data:

| Calculated— | Found— |
|---|---|
| B _____ 3.77% | B _____ 3.64% |
| Cl _____ 24.71% | Cl _____ 24.77% |

(II)

Into a two-liter, three-necked flask were added 750 ml. of xylene and 58.6 grams (1.5 gram atoms) of potassium. The flask was connected to a high speed stirrer and a dispersion was made of the potassium. A pressure equalizing funnel was attached to the flask and 221 grams (1 mole) of 2,6-di-tert-butyl-4-methylphenol was added slowly with moderate stirring. The reaction mixture which contained a voluminous precipitate was then cooled to about $-60°$ C. in a Dry Ice-acetone bath and 250.6 grams (1 mole) of boron tribromide was added slowly to the mixture. The reaction mass was then allowed to warm to room temperature and was filtered through a large sintered glass filter to remove any solids.

The filtrate was then set up for distillation through an 18-inch Vigreaux column and the xylene was removed. 303 grams (77.6% yield) of 2,6-di-tert-butyl-4-methylphenoxyboron dibromide was recovered. Chemical analysis yielded the following data:

| Calculated— | Found— |
|---|---|
| B _____ 2.76% | B _____ 2.67% |
| Br _____ 40.89% | Br _____ 40.96% |

(III)

Into a two-liter, three-necked flask were added 750 ml. of mineral oil and 10.4 grams (1.5 gram atoms) of lithium. The flask was connected to a high speed stirrer and a dispersion was made of the lithium. A pressure equalizing funnel was attached to the flask and 234 grams (1 mole) of 2,6-di-tert-amylphenol was added slowly with stirring. The reaction mixture which contained a voluminous precipitate was then cooled to about −60° C. in a Dry Ice-acetone bath and 250.6 grams (1 mole) of boron tribromide was added slowly to the mixture. The reaction mass was then allowed to warm to room temperature and was filtered through a large sintered glass filter to remove any solids.

The filtrate was then set up for distillation through an 18-inch Vigreaux column and 314.5 grams (78.1% yield) of 2,6-di-tert-amylphenoxyboron dibromide was recovered. Chemical analysis of the product yielded the following data:

| Calculated— | Found— |
|---|---|
| B _____ 2.68% | B _____ 2.57% |
| Br _____ 39.68% | Br _____ 39.73% |

(IV)

Into a two-liter, three-necked flask were added 750 ml. of toluene and 34.5 grams (1.5 gram atoms) of sodium. The flask was connected to a high speed stirrer and a dispersion was made of the sodium. A pressure equalizing funnel was attached to the flask and 304 grams (1 mole) of 2,4,6-tri-tert-amylphenol was added slowly with moderate stirring. The reaction mixture which contained a voluminous precipitate was then cooled to about −60° C. in a Dry Ice-acetone bath and 117.2 grams (1 mole) of boron trichloride was added slowly to the mixture. The reaction mass was then allowed to warm to room temperature and was filtered through a large sintered glass filter to remove any solids.

The filtrate was then set up for distillation through an 18-inch Vigreaux column and the toluene was removed. 294 grams (76.2% yield) of 2,4,6-tri-tert-amylphenoxyboron dichloride was recovered. Chemical analysis yielded the following data:

| Calculated— | Found— |
|---|---|
| B _____ 2.80% | B _____ 2.71% |
| Cl _____ 18.40% | Cl _____ 18.53% |

Example I was repeated using boron triiodide and boron trifluoride as the halogenating materials with substantially the same results as regards yields and purity. Thus all of the boron trihalides are applicable to the present invention and are all equally able to form the hindered phenolic borate esters.

Other modes of applying the principle of the invention may be employed provided the features stated in any of the following claims or the equivalent of such be employed.

We, therefore, particularly point out and distinctly claim as our invention:

1. The method for preparing 2,6-di-tert-alkylphenoxyboron dihalides which comprises preparing a dispersion of an alkali metal in an inert hydrocarbon solvent, reacting said alkali metal dispersion with a 2,6-di-tert-alkylphenol, cooling the resultant reaction mass to about −60° C., reacting said cooled reaction mass with a boron trihalide, allowing the resultant reaction mass to warm slowly to ambient temperature, removing the solids from said reaction mass and recovering substantially pure 2,6-di-tert-alkylphenoxyboron dihalide from the filtrate.

2. The method for preparing 2,6-di-tert-butylphenoxyboron dichloride which comprises preparing a sodium dispersion in toluene, reacting said sodium dispersion with 2,6-di-tert-butylphenol, cooling the reaction mass to about −60° C., reacting said cooled reaction mass with boron trichloride, allowing the resultant reaction mass to warm slowly to ambient temperature, removing the solids from the reaction mass and recovering substantially pure 2,6-di-tert-butylphenoxyboron dichloride from the filtrate.

3. The method for preparing 2,6-di-tert-butyl-4-methylphenoxyboron dibromide which comprises preparing a potassium dispersion in xylene, reacting said potassium dispersion with 2,6-di-tert-butyl-4-methylphenol, cooling the reaction mass to about −60° C., reacting said cooled reaction mass with boron tribromide, allowing the resultant reaction mass to warm slowly to ambient temperature, removing the solids from the reaction mass and recovering substantially pure 2,6-di-tert-butyl-4-methylphenoxyboron dibromide from the filtrate.

4. The method for preparing 2,6-di-tert-amylphenoxyboron dibromide which comprises preparing a lithium dispersion in mineral oil, reacting said lithium dispersion with 2,6-di-tert-amylphenol, cooling the reaction mass to about −60° C., reacting said cooled reaction mass with boron tribromide, allowing the resultant reaction mass to warm slowly to ambient temperature, removing the solids from the reaction mass and recovering substantially pure 2,6-di-tert-amylphenoxyboron dibromide from the filtrate.

5. The method for preparing 2,4,6-tri-tert-amylphenoxyboron dichloride which comprises preparing a sodium dispersion in toluene, reacting said sodium dispersion with 2,4,6-tri-tert-amylphenol, cooling the reaction mass to about −60° C., reacting said cooled reaction mass with boron trichloride, allowing the resultant reaction mass to warm slowly to ambient temperature, removing the solids from the reaction mass and recovering substantially pure 2,4,6-tri-tert-amylphenoxyboron dichloride from the filtrate.

No references cited.